(12) United States Patent
Kolb et al.

(10) Patent No.: US 11,029,284 B2
(45) Date of Patent: Jun. 8, 2021

(54) ACOUSTIC RESONANCE CHAMBER

(71) Applicant: South Dakota Board of Regents, Pierre, SD (US)

(72) Inventors: Lowell Kolb, Rapid City, SD (US); Charles Tolle, Rapid City, SD (US); Nathan Williams, Rapid City, SD (US); Jason Ash, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 206 days.

(21) Appl. No.: 16/270,447

(22) Filed: Feb. 7, 2019

(65) Prior Publication Data
US 2019/0339232 A1 Nov. 7, 2019

Related U.S. Application Data

(60) Provisional application No. 62/628,182, filed on Feb. 8, 2018.

(51) Int. Cl.
| | | |
|---|---|---|
| *G01N 29/036* | (2006.01) | |
| *G01N 29/24* | (2006.01) | |
| *G01N 29/024* | (2006.01) | |

(52) U.S. Cl.
CPC ......... *G01N 29/036* (2013.01); *G01N 29/024* (2013.01); *G01N 29/2437* (2013.01);
(Continued)

(58) Field of Classification Search
CPC ............. G01N 29/036; G01N 29/2437; G01N 2291/014; G01N 2291/021; G01N 29/024;
(Continued)

(56) References Cited

U.S. PATENT DOCUMENTS

| | | | | |
|---|---|---|---|---|
| 2,928,277 A | * | 3/1960 | Cavanagh et al. | ...... G01W 1/04 73/170.13 |
| 3,214,976 A | | 11/1965 | Miller | |
| | | (Continued) | | |

FOREIGN PATENT DOCUMENTS

| | | |
|---|---|---|
| EP | 2853871 A1 | 4/2015 |
| EP | 2853872 B1 | 5/2017 |
| GB | 931233 A | 7/1963 |

OTHER PUBLICATIONS

Benedetto, R.M., Gavioso, R. Spagnolo. Measurement of speed of sound in gas-filled acoustic resonator. IEEE Instrumentation and Measurement Technology Conference. Brussels, Belgium. 1996.

*Primary Examiner* — Benjamin R Schmitt
(74) *Attorney, Agent, or Firm* — Goodhue, Coleman & Owens, P.C.

(57) ABSTRACT

A system for determining gas characteristics at high altitudes in embodiments of the present invention may have one or more of the following features: (a) a high-altitude balloon having one or more of the following features: (a) a balloon, (b) a balloonsat operably coupled to the balloon, (c) an air path chamber wherein gas at a high altitude can occupy the air path chamber, (d) a first speaker located on a substrate within the air path chamber, wherein the first speaker takes an electrical signal input and creates a first sound wave, and (e) a second speaker located on the substrate facing opposite of the first speaker located outside of the air path chamber, wherein the second speaker takes the electrical signal and creates a second sound wave.

20 Claims, 12 Drawing Sheets

(52) U.S. Cl.
CPC . *G01N 2291/014* (2013.01); *G01N 2291/021* (2013.01); *G01N 2291/02881* (2013.01)

(58) Field of Classification Search
CPC ... G01N 2291/011; G01N 2291/02881; G01N 2291/102; G01N 29/222
See application file for complete search history.

(56) References Cited

U.S. PATENT DOCUMENTS

| | | |
|---|---|---|
| 3,318,152 A | 5/1967 | Thompson et al. |
| 4,163,382 A | 8/1979 | Amer |
| 4,164,867 A | 8/1979 | Hickling et al. |
| 4,233,843 A | 11/1980 | Thompson et al. |
| 4,317,366 A | 3/1982 | Tewes et al. |
| 4,557,603 A | 12/1985 | Oehler et al. |
| 4,740,086 A | 4/1988 | Oehler et al. |
| 4,818,882 A | 4/1989 | Nexo et al. |
| 4,866,681 A | 9/1989 | Fertig |
| 4,869,097 A | 9/1989 | Tittmann et al. |
| 4,890,687 A | 1/1990 | Medlin et al. |
| 5,060,506 A | 10/1991 | Douglas |
| 5,060,507 A | 10/1991 | Urmson et al. |
| 5,210,718 A | 5/1993 | Bjelland et al. |
| 5,211,052 A | 5/1993 | Shakkottai et al. |
| 5,386,714 A | 2/1995 | Dames |
| 5,421,212 A | 6/1995 | Mayranen et al. |
| 5,533,402 A | 7/1996 | Sarvazyan et al. |
| 5,537,854 A * | 7/1996 | Phillips .............. G01N 29/30 73/24.01 |
| 5,697,346 A | 12/1997 | Beck |
| 5,933,245 A | 8/1999 | Wood et al. |
| 6,029,501 A | 2/2000 | Nishino et al. |
| 6,192,739 B1 | 2/2001 | Logue et al. |
| 6,318,180 B1 | 11/2001 | Humphrey et al. |
| 6,481,288 B1 | 11/2002 | Humphrey et al. |
| 6,608,683 B1 | 8/2003 | Pilgrim et al. |
| 6,853,449 B2 | 2/2005 | Hocker |
| 6,979,118 B1 | 12/2005 | Mick et al. |
| 8,312,758 B2 | 11/2012 | Tobias |
| 9,459,191 B2 | 10/2016 | Downie |
| 2007/0045128 A1 | 3/2007 | Krafthefer et al. |
| 2007/0139165 A1 | 6/2007 | Liu |
| 2008/0011055 A1 | 1/2008 | Riddle |
| 2008/0282765 A1 | 11/2008 | Bonne et al. |

* cited by examiner

ACOUSTIC RESONANCE CHAMBER

PRIORITY STATEMENT

This application claims priority to U.S. Provisional Patent Application No. 62/628,182 filed on Feb. 8, 2018 titled Acoustic Resonance Chamber all of which is hereby incorporated by reference in its entirety.

GRANT REFERENCE

This invention was made with government support under NNX10AL27H awarded by National Aeronautics and Space Administration (NASA). The United States government has certain rights in the invention.

FIELD OF THE INVENTION

The present invention relates to measuring gas characteristics. Particularly, the present invention relates to measuring gas temperature and/or molecular weight. More particularly, but not exclusively, the present invention relates to measuring gas temperature and/or molecular weight at low pressures.

BACKGROUND

No practical way currently exists to measure the temperature or molecular weight of the gas in a balloon at high altitudes. These balloons operate where the ambient air pressure is so low; conventional means for measuring temperature, e.g., thermistors or thermocouples, are ineffective because they rely on convection. Acoustic measurement, which utilizes the change in the speed of sound in a gas with changing temperature, has been successfully used in other applications, e.g., measuring the temperature of combustion gas in a furnace. In a balloon, however, these methods are prone to inaccuracies if unknown or uncontrolled factors affect the measurements. First, acoustic measurement suffers from a reduction in energy transfer efficiency as the air pressure decreases with rising altitude. Further, as the altitude increases an accurate measurement of temperature requires knowledge of the molecular weight of the air or gas and the adiabatic constant of the air or gas or at least the ratio of these two properties of the air or gas.

There is a need to measure both the temperature and molecular weight of the lift gas in a balloon as well as the temperature of the ambient air outside of the balloon to efficiently control the balloon parameters for long-duration flights. Conventional means for measuring temperature are ineffective at the high altitudes (>70,000 feet) where these balloons operate because the air is so "thin". Thermistors generate heat as a by-product of measuring the temperature-related resistance of the sensor element. Thermocouples do not generate their own heat, but they rely on the property of convection of the gas to make the thermocouple the same temperature as the gas. At extremely low pressures (~0.02 atmospheres) convection is so ineffective the excess heat in a thermistor will not be carried away and the temperature it measures is dominated by its own self-heating. Further, the thermocouple suffers an excessive time lag in coming to the same temperature as the gas surrounding it and is prone to inaccurate readings if it is subject to radiant heating (e.g., sunlight).

Prior solutions for the measurement of gas molecular weight include vibratory gas density meters, which use a vibrating metal cylinder to measure gas density. However, this solution measures the vibrations of the cylinder itself, not of the gas inside it. Further, the frequency of resonance of the tube is affected by the density, pressure, and temperature of the gas surrounding and flowing through it. Thus, it is necessary to accurately measure both pressure and temperature of the gas to compensate for them. And, periodic recalibration is necessary because the vibrating cylinder deteriorates with age.

The speed of sound has been used to measure the temperature of a gas in other applications (e.g., the gas temperature in a furnace, by applying the "pitch and catch" method). A sound pulse is transmitted through the gas and received on the other side or back at the point of origin after bouncing off a reflector. The time interval between transmission and reception is used to calculate the average speed, provided the total path length is accurately known. This method of gas measurement has proved to be impractical for balloon lift gases, because the sound path distance could be 1 m or more to detect small time differences. This can be very important, considering very minute time differences can result in a fraction of a degree change in temperature (e.g., 170 nsec for 0.1° C. temperature change at a path length of 1 m in helium gas). Further, although this technique works acceptably where the gas pressure is close to atmospheric pressure at sea level, at high altitudes where the pressure is only 2% of sea level, the efficiency of transmission and reception of the sound pulse is so low it is impractical to detect a received signal. Finally, this and all acoustic temperature measurements require the ratio of the two gas characteristics, k/M (M is the molecular weight of the gas in g/mol, and, k=the adiabatic constant), be accurately known. For the lift gas in a balloon, the gas composition and therefore k/M can change over time. Because of the large difference between the molecular weight of balloon lift gas and of air, a small change in the composition of the gas will have a huge effect on the speed of sound and consequently the accuracy of temperature measurements. For example, if the percentage of helium with air changes from 99% to 98.5%, it will have the same effect on the speed of sound as a change in temperature of ~7° C.

Other solutions have used the resonant frequency of a gas sample in a resonant cavity to measure the speed of sound and calculate temperature from it. But those methods also suffer from a loss in measurement accuracy as the air or gas pressure decreases. This is because acoustic energy is conducted in the material making up the resonant chamber. At sea level atmospheric pressure, the acoustic energy lost in the material of the resonant chamber does not create a large enough error to give a faulty measurement. However, at very low gas pressures, the acoustic energy lost in the material of the resonant chamber could dominate the acoustic energy received. What is needed is a means of cancelling the conducted acoustic energy, so it does not affect the accuracy of the speed of sound measurement, particularly at low gas pressures. What is also needed is accurate knowledge of the gas properties M (molecular weight) and k (adiabatic constant) because they have a profound effect on the speed of sound in the gas.

SUMMARY

Therefore, it is a primary object, feature, or advantage of the present invention to improve over the state of the art.

A gas measurement device for low pressure atmospheres in embodiments of the present invention may have one or more of the following features: (a) an acoustic resonance chamber, (b) a speaker located within the acoustic resonance chamber, (c) an elongated air passage having the speaker at a first end of the elongated air passage and a first microphone at a second end of the elongated air passage, (d) an elongated conductive passage extending outward from the speaker at a first end of the elongated conductive passage, opposite the elongated air passage and having a second microphone at a second end of the elongated conductive passage, (e) a pump operably coupled to the acoustic resonance chamber capable of pumping air into the elongated air passage, (f) at least one slot within the acoustic resonance chamber along the elongated conductive passage traversing from proximal the second microphone to proximal a second speaker, (g) at least one thermocouple located between the first microphone and the speaker within the elongated air passage, the at least one thermocouple measuring the temperature of a gas within the elongated air passage, (h) a housing, wherein the acoustic resonance chamber is within the housing to reduce vibration and movement, (i) a radiation shield operably coupled over the housing to provide adequate thermal shielding to the housing, (j) an acoustic resonance chamber circuit electrically coupled to the acoustic resonance chamber within the housing, the acoustic resonance chamber circuit electrically coupled to the first and second microphone to measure the frequency of a sound wave in the elongated air passage and calculate a speed of the sound of the sound wave created by the first speaker, and (k) a processor within the acoustic resonance chamber circuit for calculating a temperature and k/M ratio of a low-pressure gas within the elongated air passage.

A method of measuring gas characteristics at low pressure atmospheres in embodiments of the present invention may have one or more of the following steps: (a) providing an air path chamber having a first speaker located on a substrate on a first end of the air path chamber, a first microphone located within the air path chamber on a second end of the air path chamber opposite the first speaker, (b) inserting a gas into the air path chamber, (c) initiating a first sound wave within the air path chamber through the first speaker, (d) receiving the first sound wave at the first microphone located within the air path chamber, (e) calculating a frequency of the first sound wave, (f) calculating the speed of the first sound wave, (g) calculating a k/M ratio of the gas, (h) calculating a temperature of the gas based upon the k/M ration, frequency and speed of the sound wave, (i) providing a conductive chamber extending outward from the speaker at a first end of the conductive chamber, opposite the air path chamber and having a second microphone at a second end of the elongated conductive chamber; (j) receiving a second sound wave produced by the first speaker at a second microphone located within a conductive chamber; (k) calculating a summed sound wave by subtracting the first received sound wave at the first microphone from the second received sound wave at the second microphone, (l) amplifying the first sound wave received at the first microphone and amplifying the second sound wave at the second microphone, (m) eliminating frequencies by notch filtering the summed sound wave, (n) pressurizing a housing which houses the air path chamber with a pump, allowing the gas to enter the air path chamber, (o) measuring the temperature of the gas within the air pathway with a thermocouple located between the speaker and the first microphone, (p) sensing, with a vibration sensor, the vibrations produced in the substrate by the first speaker and a second speaker located next to the first speaker on the substrate, (q) subtracting the sensed vibration at an electrical detection and control circuit which drives the second speaker with a modified electrical signal, and (r) producing a third sound wave from the modified electrical signal at the second speaker, wherein the third sound wave is subtracted from the first sound wave and the result is an even smaller magnitude of sensed vibration.

A system for determining gas characteristics at high altitudes in embodiments of the present invention may have one or more of the following features: (a) a high-altitude balloon having one or more of the following features: (a) a balloon, (b) a balloonsat operably coupled to the balloon, (c) an air path chamber wherein gas at a high altitude can occupy the air path chamber, (d) a first speaker located on a substrate within the air path chamber, wherein the first speaker takes an electrical signal input and creates a first sound wave, (e) a second speaker located on the substrate facing opposite of the first speaker located outside of the air path chamber, wherein the second speaker takes the electrical signal and creates a second sound wave, (f) a vibration sensor coupled to the substrate capable of measuring vibrations conducted by the substrate, wherein the vibration is the difference between the first and the second sound wave, (g) a feedback control system electrically coupled to the air path chamber, wherein the feedback control system sends an output of the vibration sensor to a electrical detection and control circuit which subtracts the output of the vibration sensor from the electrical signal originally driving the first and the second speakers, wherein the difference between the electrical signal and the vibration sensor is sent to the second speaker to create a third sound wave, the vibration sensor then detects a difference between the first sound wave and the third sound wave to minimize vibrations being conducted into the air path chamber, and (h) a microphone located within the air path chamber opposite the first speaker, (i) a silicone foam block and end cap coupled to the microphone to prevent conducted vibrations traveling through the substrate from reaching the microphone, (j) a silicone coupler located midway between the first speaker and the microphone to isolate the microphone from vibrations traveling through the substrate, and (k) a first piezo driver amplifying the electrical signal to the first speaker and a second piezo driver amplifying the signal from the electrical detection and control circuit to the second speaker.

One or more of these and/or other objects, features, or advantages of the present invention will become apparent from the specification and following claims. No single embodiment need provide every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

Figure 1:
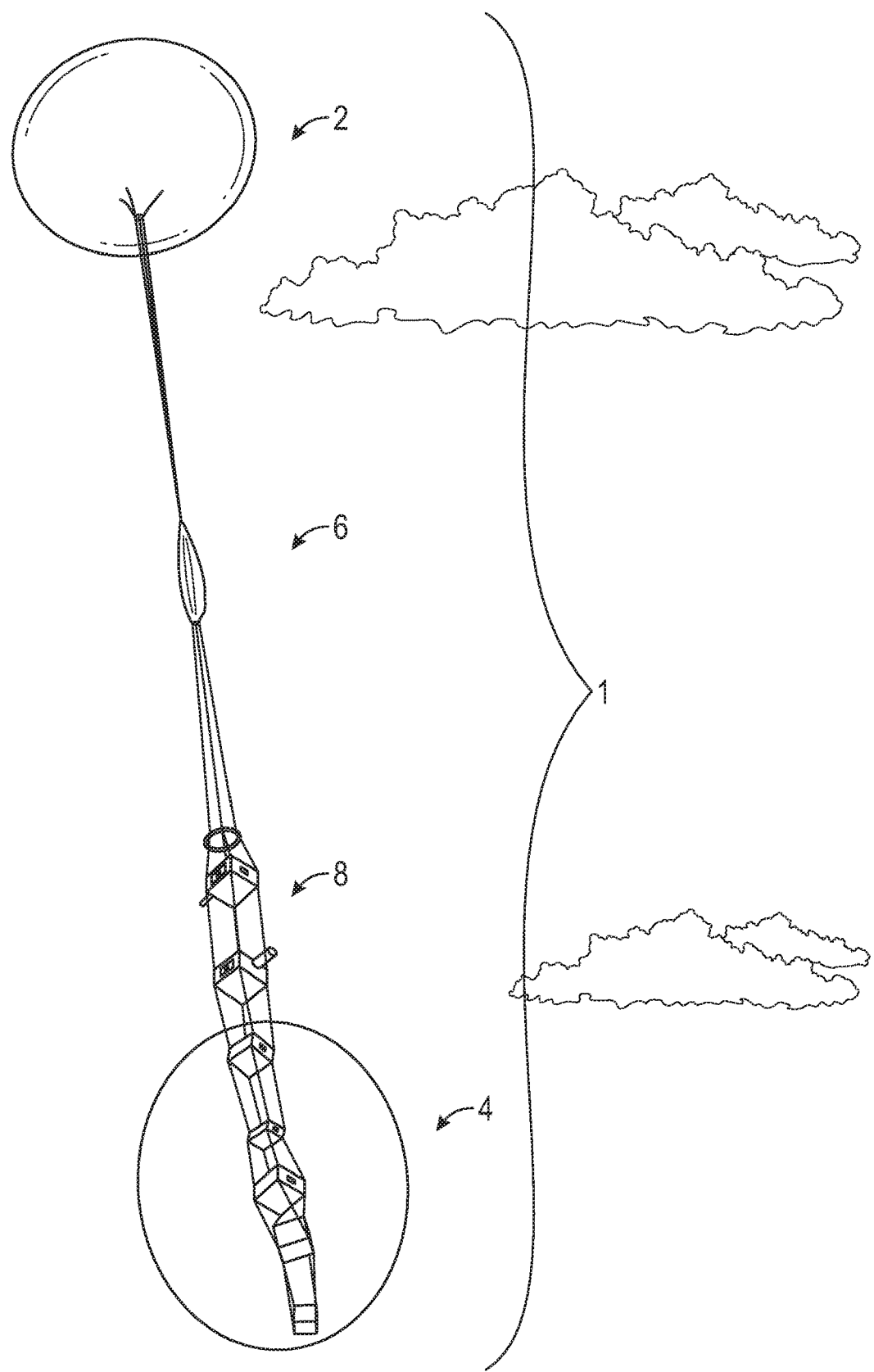
FIG. 1 is a high-altitude balloon in accordance with an embodiment of the present invention.

Some of the figures include graphical and ornamental elements. It is to be understood the illustrative embodiments contemplate all permutations and combinations of the various graphical elements set forth in the figures thereof.

DETAILED DESCRIPTION

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of devices to measure temperature and molecular weight of gasses at low air pressure, it is fully contemplated embodiments of the present invention could be used in most any gas measurement device without departing from the spirit of the invention.

An acoustic resonance chamber in embodiments of the present invention may have one or more of the following features: (a) at least one speaker located within the resonance chamber, (b) an elongated air passage having the at least one speaker at a first end of the air passage and a first microphone at a second end of the passage, (c) an elongated conductive passage having the at least one speaker at a first end of the conductive passage and a second microphone at a second end of the passage, (d) a pump operably coupled to the resonance chamber capable of pumping air into the air passage, (e) at least one slot located along the elongated conductive passage, (f) at least one thermocouple located within the elongated air passage, (g) a housing operably coupled to the acoustic resonance chamber, (h) a radiation shield operably coupled to the housing, (i) an acoustic resonance chamber circuit within the housing operably coupled to the first and second microphone, and (j) a processor within the acoustic resonance chamber circuit for calculating the temperature and k/M ratio of low pressure air or gas.

A method of measuring gas characteristics in embodiments of the present invention may have one or more of the following steps: (a) pumping air or gas into an air path of a resonant chamber, (b) initiating a sound wave at a speaker within the resonant chamber, (c) receiving the sound wave at a first microphone located within an air pathway, (d) receiving the sound wave at a second microphone located with a conductive pathway, (e) subtracting a received sound wave at the second microphone from a received sound wave at the first microphone creating a summed sound wave, (f) calculating a frequency of the summed sound wave, (g) amplifying the sound wave received at the first and second microphones, (h) notch filtering the summed sound wave, (i) calculating the speed of the sound wave, (j) pressurizing the air pathway, (k) measuring the temperature of a pressurized gas, (l) calculating an accurate temperature of low pressure air, and (m) calculating a k/M ratio to determine the pressurized gas's characteristics.

A system for determining gas characteristics in embodiments of the present invention may have one or more of the following features: (a) an acoustic resonance circuit for processing gas characteristic data, (b) a resonant chamber operably coupled to the acoustic resonance circuit, (c) a resonant chamber housing operably coupled to the resonant chamber, (d) a radiation shield located on the outside of the resonant chamber housing, (e) an air pathway and a conductive pathway located within the resonant chamber, (f) a speaker located between the air pathway and the conductive pathway, (g) a first microphone located opposite the speaker at the end of the air pathway, and (h) a second microphone located opposite the speaker at the end of the conductive pathway.

The present invention discloses embodiments for a method and apparatus to measure temperature and/or molecular weight of a gas by utilizing the speed of sound in the gas at pressures as low as 0.01 atm. Further, embodiments of the present invention can be implemented inexpensively, or made smaller and more accurate than current methods. Therefore, current methods of measurement could be replaced for those applications even at normal or elevated operating pressures. This could be beneficial for the power and gas turbine industry, Embodiments of the present invention reduce the energy transfer efficiency problem by making the speed of sound measurements in a small, enclosed chamber. This provides a way to mitigate certain measurement errors, which become large at low pressures. It also provides a novel way to accurately measure the molecular weight of a gas. Embodiments of the present invention could also be useful for other applications besides balloons (e.g., scientific instruments) by measuring the speed of sound in the gas sample at a known temperature.

The possibility of using the speed of sound in a gas to measure its temperature has been explored before. The speed of sound in a gas is a strong function of the temperature of the gas as well as its molecular weight and the adiabatic constant of the gas. According to the formula in Equation 1:

$$v = \sqrt{\frac{kRT}{M}},$$

where v is the speed of sound in the gas in m/sec. R is the universal gas constant (8314.32 J/kmol-K). T is absolute temperature in ° K. M is the molecular weight of the gas in g/mol. And, k=the adiabatic constant (a characteristic of the specific gas, ranging from 1.0 for complex gas molecules to 1.4 for air to 1.667 for all noble gases, e.g., helium).

This formula can be used to determine the gas characteristic k/M from the measured speed of sound in the gas if the temperature of the gas is known, or the temperature of the gas if the k/M characteristic is known. This invention provides a way to do both by means of two similar "acoustic resonance chambers" measuring the resonant frequency of a column of air or gas in a chamber of fixed or known length. The speed of sound in a gas can then be computed from the frequency, f, of resonance of a simple closed cylinder of length l using Equation 2, f=v/l provided the resonance inside the chamber is restricted to a single wavelength. Other resonant modes may be used besides the single wavelength mode without departing from the spirit of the invention. Eq. 2 is affected only by including a term which gives the number of wavelengths fitting in the length l. It is also possible to use the multiple resonance modes in a cell (i.e., the fact the cell will resonant at any integer multiple of a half-wavelength) to measure the frequency difference between two resonant modes and use the frequency difference to calculate the speed of sound.

An advantage of the resonant cell in low pressures is the transmission distance can be short, e.g., on the order of 0.12 m, and the resonant chamber prevents most of the sound energy from escaping due to the small size of the resonant chamber. Thus, the resonant chamber continues to function even as the gas pressure drops and the energy transfer process becomes less efficient. Also, a resonant chamber 0.12 m long will resonant at frequencies between 2.2 kHz and 8.9 kHz in air or balloon gas for the expected temperatures. The frequency measurement circuit only needs to discriminate a change of 0.5 Hz to have a measurement precision of 0.1° C. The simplest method of measuring frequency involves counting cycles for a known period. Using this method, 0.5 Hz resolution is obtained by setting the measurement interval to 2 seconds. Longer measurement intervals would provide increased temperature resolution.

Other design considerations for a functional resonant acoustic pyrometer are as follows:

(1) the gas could be exchanged in the resonant chamber periodically or continuously to be representative of the gas being measured. However, directional movement of the gas inside the resonant chamber can cause measurement errors because of the Doppler effect. This could be considered with whatever method is used to exchange the gas. For example, the gas flow rate can be kept low, or the gas may be transferred in batches with some time allowed for turbulence to subside or other means employed to cancel out the Doppler effect.

(2) The accuracy of the device depends on the length of the resonant chamber either remaining constant or, if the length changes with temperature, a method could be provided to correct for it in the calculations.

(3) Radiant heating of the tube, e.g., from solar radiation, could cause errors if the length of the tube changes with temperature, or if the tube is heated enough to transfer heat to the air being measured.

(4) Sound will be conducted by the walls of the resonant chamber from the transmitter (speaker) to the receiver (microphone) at a different velocity compared to the air path. The sound energy arriving from the conducted path will cause a phase error in the received signal, which will shift the resonant frequency. As the gas pressure drops, the percentage of the sound energy received from the conducted path will increase, causing the error to increase at low pressures.

(5) Other sources for phase shift, e.g., amplifier roll-off or filter characteristics, will also affect the accuracy of measurement.

(6) For temperature to be measured accurately, accurate values for the gas characteristic k/M are needed, because the gas makeup can change over the duration of a balloon flight due to diffusion or slow gas leaks.

These issues are addressed as follows: (1) the device could have support equipment and electronics to move the gas through the cell without changing the temperature, e.g., by compressing it or by friction loss in pipes. The design could move the gas slowly, so the Doppler effect does not cause significant errors, or the gas could be moved in and out of the chamber in discrete batches to minimize motion inside the chamber during measurements. However, if the chamber is operated at the frequency where it resonants at one full wavelength it can be ported at appropriate locations where it will have the minimum disruption of the resonance. For example, air can be injected and exhausted at the locations where the standing acoustic resonance has nodes, and the motion of the air in both directions will tend to minimize the Doppler effect.

(2) A very low coefficient of thermal expansion (CTE) would be useful for the material from which the chamber is constructed to minimize the change in cell dimensions due to temperature. In the case where the CTE is not sufficiently small to make expansion negligible, the expansion effect could be calibrated out, although it may cause temporary measurement errors if the temperature changes more rapidly than the material expands or contracts.

(3) A shroud can be designed to shield the measurement cell from the sun, which also provides enough gas flow inside the shroud to prevent re-radiation and convection from causing excess measurement errors.

(4) The design of the cell can include a second chamber on the opposite side of the speaker for cancelling the conducted signal path. The compensation chamber has the same path length as the primary resonance chamber and a similar acoustic receiver to duplicate the characteristics of the conducted path. However, it is designed to have a much higher path loss for the acoustic path in gas than the primary chamber. Thus, when the electrical signal from the compensation path is electronically subtracted from the primary resonance chamber, the conducted signal is cancelled with minimal disruption to the signal via the gas path. Increased path loss in the compensation chamber could be accomplished by providing an acoustic absorbing material inside the chamber. However, such a material may be prone to condensation or icing under certain operational conditions. A better solution may be to cut slots lengthwise in the compensation chamber, which would significantly reduce the efficiency of the tube for supporting an acoustic resonance in the column of gas and would still have minimal disruption to the conducted acoustic path.

(5) The electronic control loop could have enough frequency bandwidth to minimize phase shifts in the operational range. However, some phase shifts at the very highest frequencies may be mitigated by introducing a phase compensation at the highest operational frequency or by calibrating the measured temperature for known phase shifts.

Embodiments of the present invention include an effective way to deal with changes in the lift gas characteristics, e.g., due to slow leaks. Since the device accurately measures the speed of sound in a gas, this information can be used either to calculate temperature when gas characteristics are known, or to calculate the gas characteristics when the temperature is known. The implementation of the gas characteristics measurement is accomplished by compressing a sample of the lift gas in a pressure vessel sufficiently, so its temperature can be accurately measured with more conventional means (e.g., a thermocouple or a laser pyrometer). When the speed of sound is measured by the resonant device, the gas properties can be computed, making them available for use with a companion device to measure the temperature of the undisturbed gas. The rising temperature of the gas due to compression is not a concern as the temperature can be accurately measured in the pressurized gas. A known temperature and the speed of sound in the gas are enough to compute the gas properties k/M with high accuracy.

This suggests another possible use for embodiments of the present invention (i.e., measuring gas characteristics at all atmospheric pressures). An instrument for measuring gas properties could be built using the resonant chamber and an accurate thermometer to measure the temperature of the gas being tested. The temperature of the gas and the speed of sound are enough to accurately measure k/M. Since the value for k generally ranges from 1.4 (for air) to 1.667 for noble gasses, using 1.5275, the geometric mean of those values, would result in a maximum error of less than 10% for gasses known to have a value of k/M in this range. In applications where more is known about the nature of the gas being tested, this error can be further reduced. For example, the method is inherently quite accurate as an instrument to measure the relative percentages (e.g., helium and air, because the k/M ratio for each is a distinct constant, so a measurement of k/M is enough to accurately compute the relative compositions of helium mixed with air). The technique is at its most accurate at discriminating the relative concentrations of helium and air where the concentration is dominated by the lighter gas, which happens to be where accuracy is the most useful for lift gases in balloons.

The accuracy of the cell is not subject to such calibration and aging effects as prior solutions to measuring the characteristics of gas.

With reference to FIG. 1, a high-altitude balloon 1 in an embodiment of the present invention is shown. A high-altitude balloon 1 either manned or unmanned balloons 2, is usually filled with helium or hydrogen and rarely methane, and released into the stratosphere, generally attaining between 18 and 37 km (11 and 23 mi; 59,000 and 121,000 ft) above sea level. Balloon 2 will be coupled to a recovery parachute 6 coupled to a near space shuttle 8 and a balloon-sat 4.

The most common type of high-altitude balloons 1 are weather balloons. Other purposes include use as a platform for experiments in the upper atmosphere. Modern high-altitude balloons 1 generally contain electronic equipment such as radio transmitters, cameras, or satellite navigation systems, such as GPS receivers.

These high altitude balloons 1 are launched into what is termed "near space", defined as the area of Earth's atmosphere between the Armstrong limit (18-19 km (11-12 mi) above sea level), where pressure falls to the point a human being could not survive without a pressurized suit, and the Kármán line (100 km (62 mi) above sea level), where astronautics must take over from aerodynamics in order to maintain flight.

Due to the low cost of GPS and communications equipment, high-altitude: ballooning is a popular hobby, with organizations such as UKHAS (UK High Altitude Society) assisting the development of payloads. A BalloonSat 4 is a simple package designed to carry lightweight experiments into near space. They are a popular introduction to engineering principles in some high school and college courses. BalloonSats 4 are carried as secondary payloads on ARHAB (amateur radio high-altitude ballooning) flights. One reason BalloonSats 4 are simple is because they do not require the inclusion of tracking equipment; as secondary payloads, they already are being carried by tracking capsules.

Often the design of a Balloon Sat 4 is under weight and volume constraints. This encourages good engineering practices, introduces a challenge, and allows for the inclusion of many BalloonSats 4 on an ARHAB flight. The airframe material is usually Styrofoam or Foamcore, as they are lightweight, easy to machine, and provide reasonably good insulation.

Most carry sensors, data loggers and small cameras operated by timer circuits. Popular sensors include air temperature, relative humidity, tilt, and acceleration. Experiments carried inside BalloonSats 4 have included such things as captive insects and food items.

Before launch, most BalloonSats 4 are required to undergo testing. These tests are designed to ensure the BalloonSat 4 will function properly and return science results. The tests include a cold soak, drop test, function test, and weighing. The cold soak test simulates the intense cold temperatures the BalloonSat 4 will experience during its mission. A launch and landing can be traumatic; therefore, the drop test requires the Balloon Sat 4 to hold together and still function after an abrupt drop.

The inventors discovered there was a need to measure the temperature and composition of the lift gas in high-altitude balloons 1. By knowing the temperature and composition of the lift gas, the health of the balloon 2 can be obtained. As discussed above, temperatures cannot be accurately measured currently because current methods rely on convection. The inventors needed to gather meaningful, accurate and scientific data on the health of a balloon 2 and therefore, there was need to determine the temperature and mixture of the gas in the balloon 2.

1. Because the speed of sound in a gas is dependent on the temperature of the gas, the temperature can be calculated from a measured frequency and wavelength. If the wavelength is known and the frequency can be measured, then the speed of the sound wave can be found from rearranging Equation 2: $v=l*f$. In the equation, v is the speed of the sound wave, l is the wavelength of the sound wave and f is the frequency of the sound wave.

Combining equation, $v=l*f$ with $$v = \sqrt{\frac{kRT}{M}}$$

and solving for temperature gives the following equation:

$$T = \frac{(lf)^2 M}{kR}.$$

Therefore, once the ratio of the adiabatic constant to molecular weight is found, the rest of the variables are known or are measured.

Figure 2:
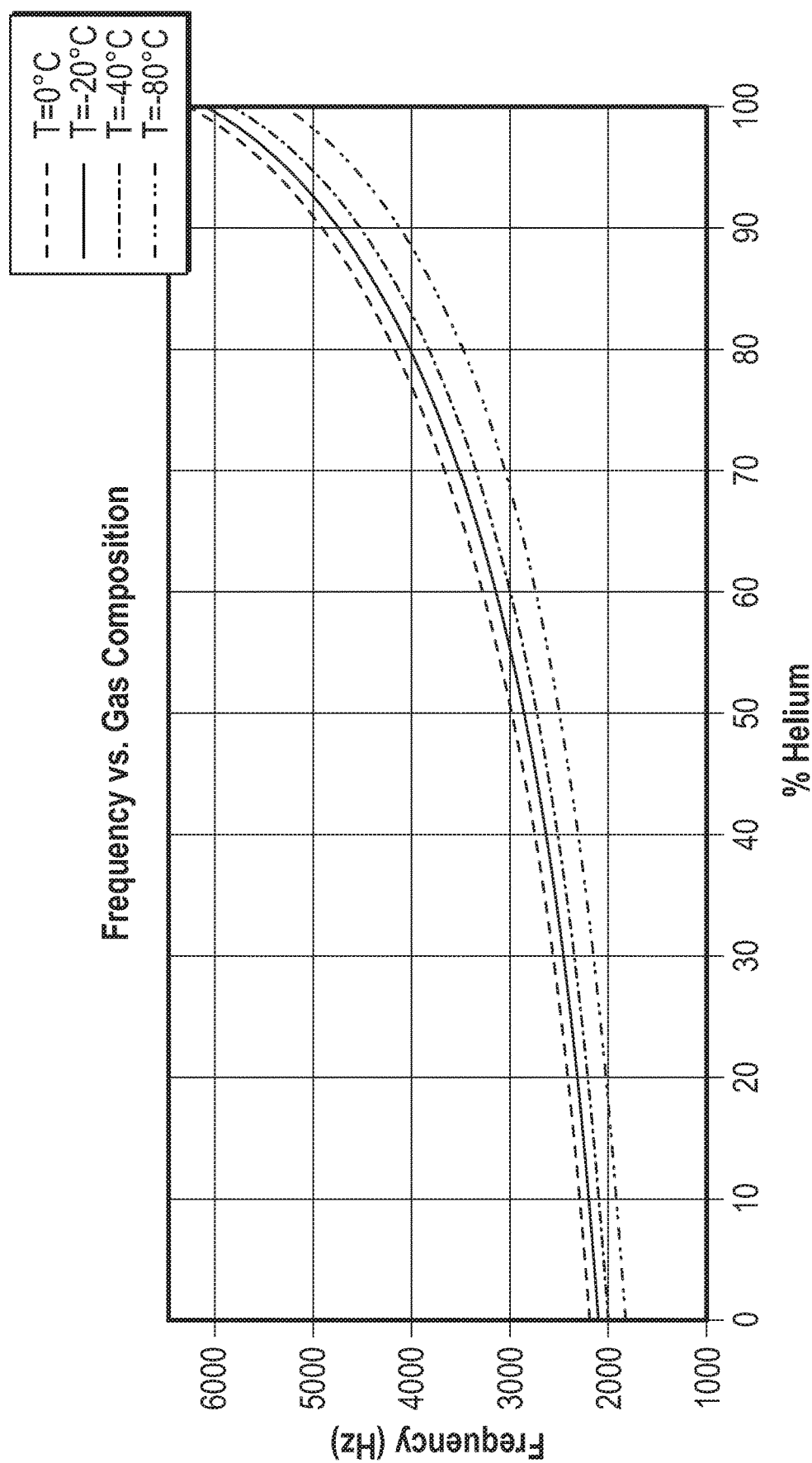
FIG. 2 is a graph diagram showing the frequency effect on air versus the percentage of helium in the air for varying temperatures in accordance with embodiments of the present invention.

With reference to FIG. 2, sound frequency changes versus gas composition correlate nonlinearly. Thus, the gas composition will need to be known to accurately calculate temperature.

Figure 3A:
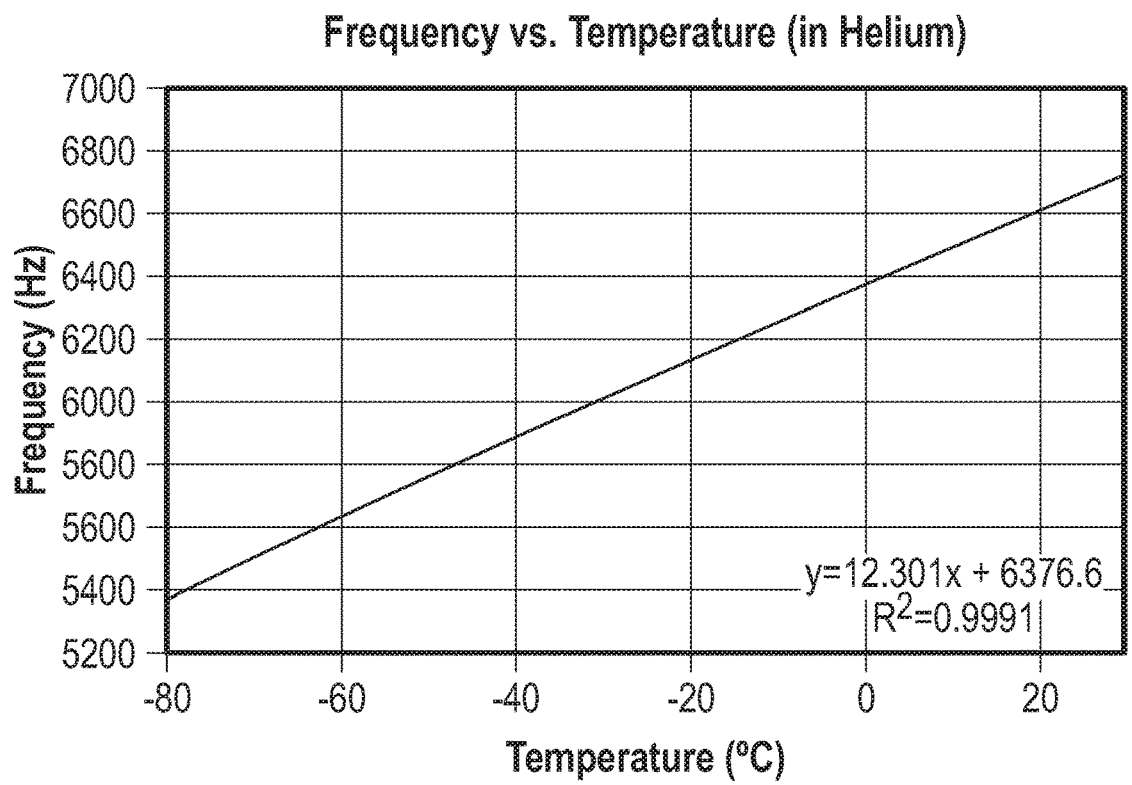
FIGS. 3A & B are graphs showing the frequency response of helium and air in increasing temperatures in accordance with embodiments of the present invention.
Figure 3B:
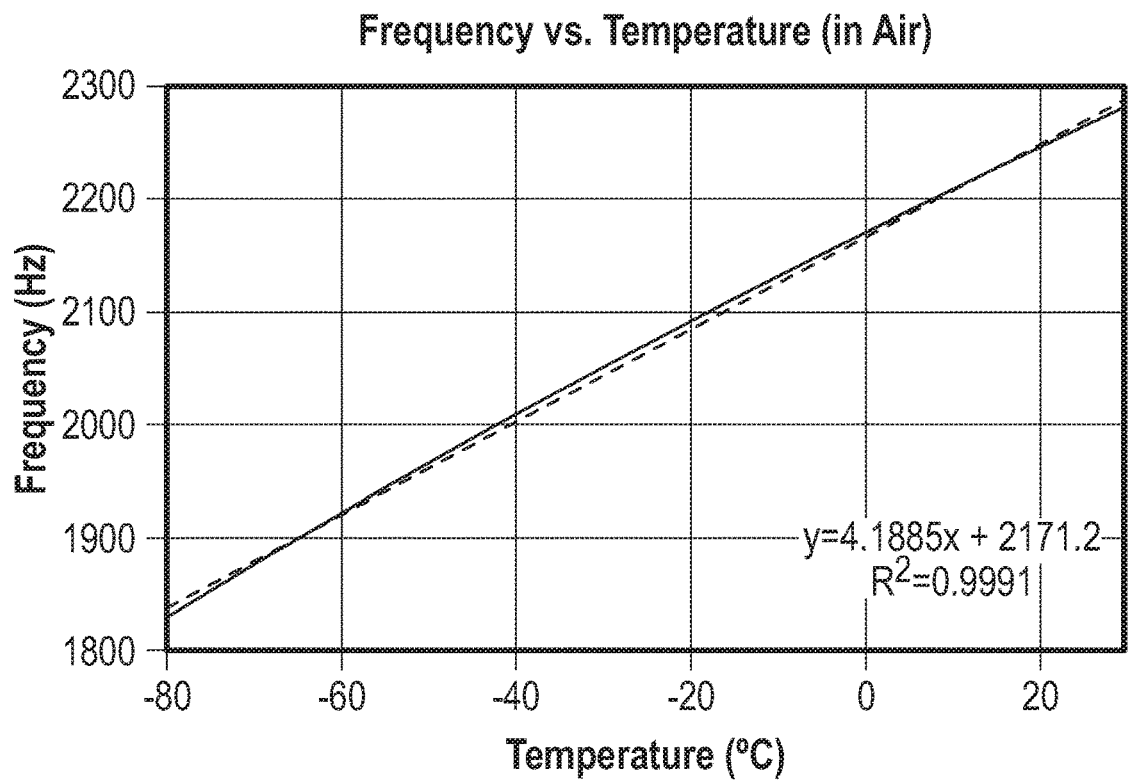

With reference to FIG. 3, the difference in frequency response for helium and air as temperatures increase can be shown. In air, the approximate slope is 4.2 Hz/° C. and in helium, the approximate slope is 12.3 Hz/° C. These charts show how important it will be to know the composition of the gas. From the charts it can be shown the effect of increased or decreased helium concentration can have on the frequency. The measurement device in accordance with embodiments of the present invention would need to measure down to temperatures of −80° C. (−112° F.) as the temperatures at high altitudes can be cold. Further, it will be expected to determine the ratio of helium to air in the balloon. Since buoyancy is affected by gas temperatures inside and outside the balloon as well as gas composition, these parameters will be useful for evaluating the "health" of the balloon.

In operation, the acoustic resonance chamber circuit of the present invention can be placed in the apex, middle or near the base of the balloon or any other useful location. The acoustic resonance chamber circuit can make measurements at any altitude less than its rated maximum altitude. The acoustic resonance chamber circuit data can be saved and analyzed after flight or can be transmitted in real time for constant monitoring.

Figure 4:
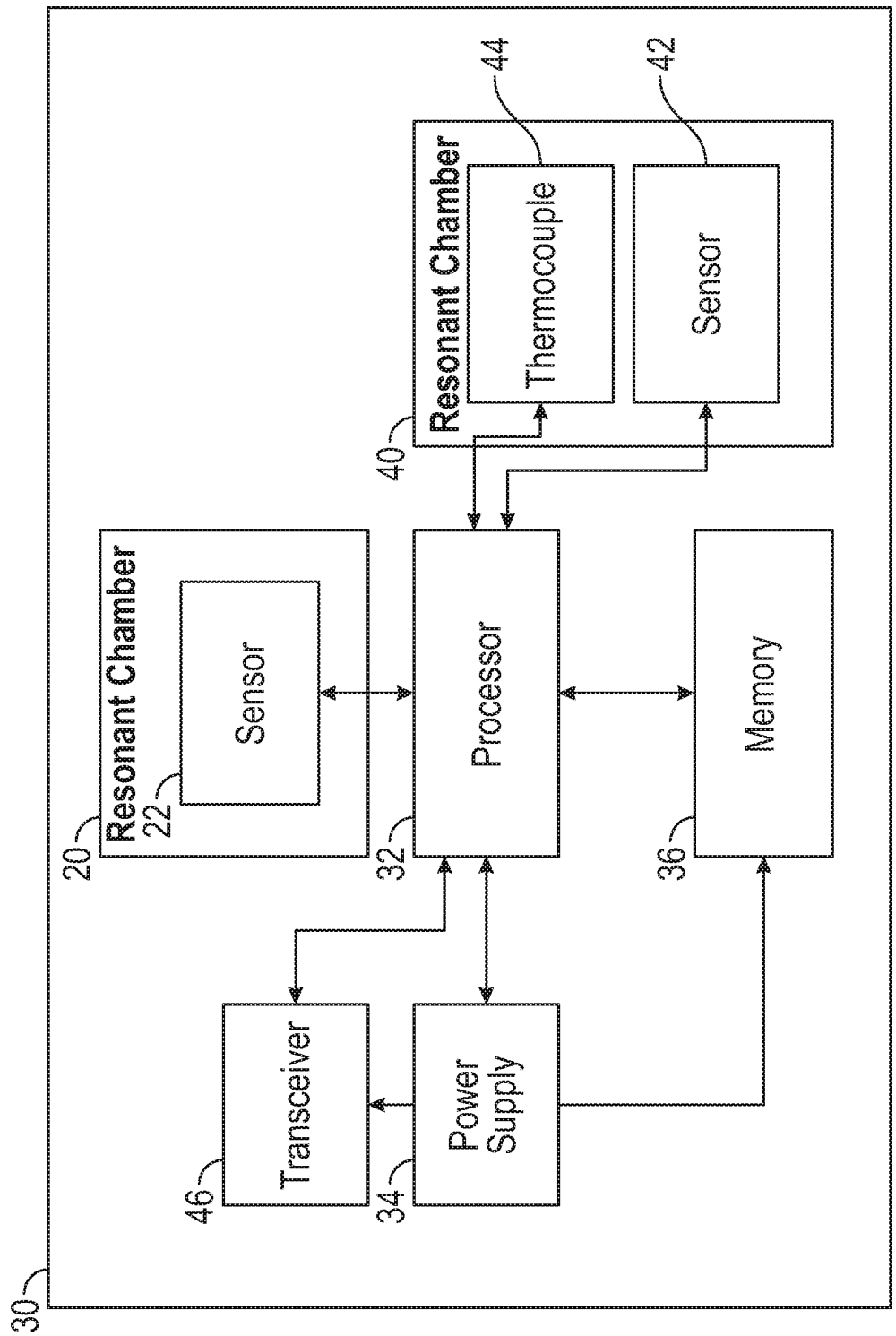
FIG. 4 is a block diagram showing an acoustic resonance chamber circuit in accordance with embodiments of the present invention.

With reference to FIG. 4, a block diagram showing an acoustic resonance chamber circuit in accordance with embodiments of the present invention is shown. Acoustic resonance chamber circuit 30 is shown with a power supply 34, a processor 32, transceiver 46, memory 36, acoustic resonance chamber 20 housing a sensor 22 and a second acoustic resonance chamber 40 housing a thermocouple 44 and sensor 42. There is a need to measure both the temperature and molecular weight of the lift gas in a balloon as well as the temperature of the ambient air outside of the balloon 2 to efficiently control the balloon parameters for long-duration flights. Balloonists need to know both the temperature of the lift gas in the envelope and the ambient air outside of it, which is why embodiments of the present invention accommodate a full range of gas compositions. The skin of the balloon 2 affects how much radiated energy (e.g., from the sun) is absorbed to heat up the lift gas, as well as the rate at which heat transfers between the balloon 2 and the ambient air. It is common for the two temperatures inside and outside the balloon 2 to be different, and buoyancy is affected by both temperatures.

A power supply 34 may be operably connected to all the components within the acoustic resonance chamber circuit 30. The power supply 34 should provide enough power to operate the acoustic resonance chamber circuit 30 for a reasonable duration of time. The power supply 34 may be of any type suitable for powering the acoustic resonance chamber circuit 30. However, the power supply 34 need not be present in the acoustic resonance chamber circuit 30. Alternative battery-less power sources, such as sensors configured to receive energy from radio waves (all of which are operatively connected to one or more acoustic resonance chamber circuits 30) may be used to power the acoustic resonance chamber circuit 30 in lieu of the power supply 34. The power supply 34 is a power storage device configured to power the acoustic resonance chamber circuit 30. In other embodiments, the power supply 34 may represent a fuel cell, thermal electric generator, piezo electric charger, solar charger, ultra-capacitor or other existing or developing power storage technologies. In other embodiments, the power supply 34 may take electrical power from a common power source supplying other systems aboard the balloon and convert it to voltages useful for the acoustic resonance chamber circuit 30.

Power supply 34 can be controlled by and provide power to processor 32. The processor 32 is the logic controls of the operation and functionality of the acoustic resonance chamber circuit 30. The processor 32 may include circuitry, chips and other digital logic. The processor 32 may also include programs, scripts, and instructions, such as gas-characteristics program 700, which may be implemented to operate the processor 32. The processor 32 may represent hardware, software, firmware, or any combination thereof. In one embodiment, the processor 32 may include one or more processors, such as microprocessors. The processor 32 may also represent an application specific integrated circuit (ASIC) or field programmable gate array (FPGA). Processor 32 could also fully implement gas-characteristic program 700 (FIG. 7), task share an implementation of gas-characteristic program 700 with a mobile device and/or network and/or be a support tool for implementation of gas-characteristic program 700 without departing from the spirit of the invention.

The processor 32 is circuitry or logic enabled to control execution of a set of instructions. The processor 32 may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may also manage transmission and reception of audio and data, GPS information, wireless LAN, GSM, or LTE, SIM or data cards or so forth. The processor may be a single chip or integrated with other computing or communications elements of the acoustic resonance chamber circuit 30.

Processor 32 can be coupled to memory 36. The memory 36 is a hardware component, device, or recording media configured to store data for subsequent retrieval or access later. The memory 36 may be static or dynamic memory. The memory 36 may include a hard disk, random access memory, cache, removable media drive, mass storage, or configuration suitable as storage for data, instructions and information. In one embodiment, the memory 36 and the processor 32 may be integrated. The memory 36 may use any type of volatile or non-volatile storage techniques and mediums. The memory 36 may store information related to gas temperature, molecular weight or any other function related to gas testing, such as previous actions or readings. In one embodiment, the memory 36 may display instructions or programs for controlling the acoustic resonance chamber circuit 30.

A wireless transceiver 46 may be disposed within the acoustic resonance chamber circuit 30 and may receive signals from or transmit signals to a mobile device or network outside the acoustic resonance chamber circuit 30. The signals received from or transmitted by the wireless transceiver 46 may encode data or information related to media or information related to the balloon or the functioning of the acoustic resonance chamber circuit 30. For example, if a user desires to download data to a mobile device or a laptop, the user may communicate directly via the wireless transceiver 46 to the mobile device or laptop instructing the acoustic resonance chamber circuit 30 to download the data to the mobile device or laptop. More than one signal may be received from or transmitted by the wireless transceiver 46.

Pressure or resonant chamber 20 and 40, discussed in greater detail below, houses a sensor 22 and 42, respectively. Resonant chamber 40 also includes a thermocouple 44. The construction and operation of acoustic resonance chamber 40 and 20 are discussed in greater detail below. Thermocouple 44 can be most any type of temperature sensor such as a thermometer, thermistor, thermocouple, a bimetallic strip, a resistance thermometer or a silicon bandgap temperature sensor without departing from the spirit of the invention. Resonant chamber 40, also known as the k/M resonant chamber, is used to determine the ratio of the gas parameters, k and M, for the air or gas. Thermocouple 44 provides the necessary information about the temperature of the gas sample in resonant chamber 40, which is used along with the resonant frequency from sensor 42 to compute the ratio of the gas parameters. Air or gas from the same source is introduced into resonant chamber 20, also known as the T Resonant Chamber, where its resonant frequency is measured using sensor 22. Processor 32 combines the gas parameters from resonant chamber 40 and the frequency from resonant chamber 20 to calculate the temperature of the gas in resonant chamber 20.

Figure 5:
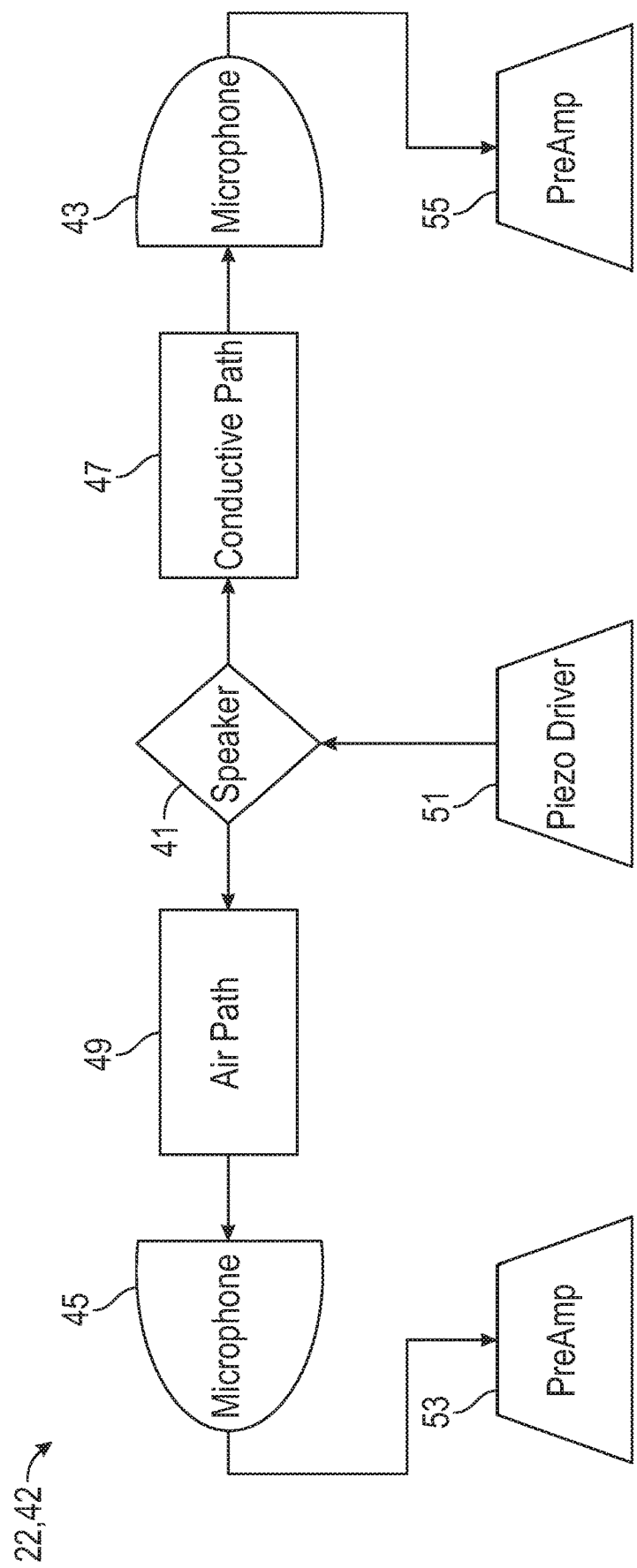
FIG. 5 is a block diagram of an acoustic resonance chamber in accordance with embodiments of the present invention.

With reference to FIG. 5, a block diagram of an acoustic resonance sensor 22 and 42 in accordance with embodiments of the present invention is shown. Acoustic resonance sensor 22, 42, consists of a piezo speaker 41 and two piezo microphones 43, 45. Piezo microphones 43 and 45 are preferably identical to provide for symmetry in acoustic resonance sensor 22, 42. As discussed in detail above, a signal traveling the conductive path 47 is subtracted from a signal traveling along air path 49 to compensate for an unwanted conducted acoustic energy in air path 49. Piezo speaker 41 is powered by an amplifier or piezo driver 51. Further, the outputs of microphones 45 and 43 are amplified by preamps 53 and 55 respectively. As discussed above, sound will be conducted by the walls of the resonant chamber 20 and 40 from the speaker 41 to the microphones 43, 45 at a different velocity in the conductive path 47 than the air path 49. The sound energy arriving from the conducted path 47 will cause a phase error in the received signal, which will shift the resonant frequency. As the gas pressure drops, the percentage of the sound energy received from the air path 49 will decrease while the sound energy in the conducted path 47 remains unchanged, causing the error to increase at low pressures.

The design of the acoustic resonance chamber 20 and 40 includes conductive path 47 on the opposite side of the air path 49 for cancelling the conducted signal path. The conductive path 47 has the same path length as the primary resonance chamber or air path 49 and a similar microphone 43 to duplicate the conducted acoustic characteristics of the air path 49. However, it is designed to have a much higher air acoustic loss for the conductive path 47 than the air path 49. Thus, when the electrical signal from the conductive path 47 is electronically subtracted from the air path 49, the conducted acoustic signal is cancelled with minimal disruption to the air acoustic signal. Increased air acoustic loss in the conductive path 47 could be accomplished by providing an acoustic absorbing material inside the chamber. However, such a material may be prone to condensation or icing under certain operational conditions. A better solution may be to cut slots 52 lengthwise in the conductive path 47, which would significantly reduce the efficiency of the tube for supporting air acoustic resonance in the column of gas and would still have minimal disruption to the conducted path 47.

Figure 6:
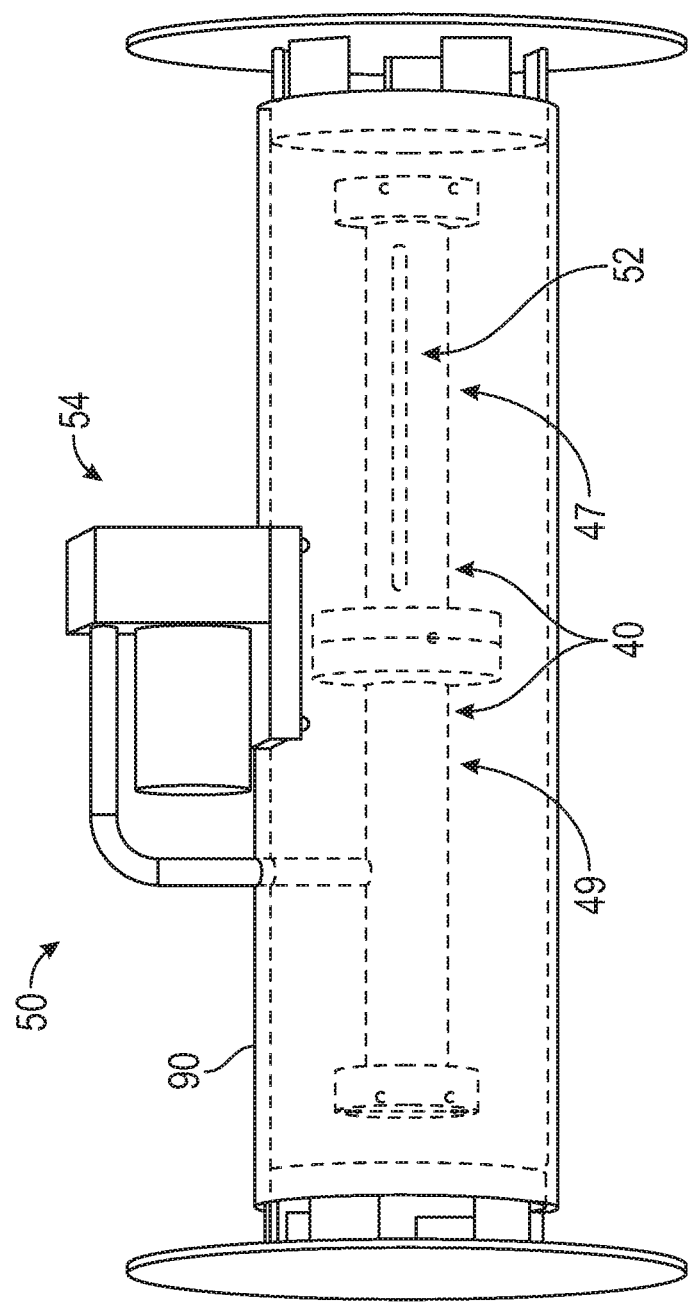
FIG. 6 is a pictorial representation of an acoustic resonance chamber housing in accordance with embodiments of the present invention.

With reference to FIG. 6, a pictorial representation of an acoustic resonance chamber housing 50 in accordance with embodiments of the present invention is shown. The accuracy of the acoustic resonance chamber circuit 30 depends on the length of the resonant chamber 20 and 40 either remaining constant or, if the length changes with temperature, a method could be provided to correct for it in the calculations. A very low coefficient of thermal expansion (CTE) would be useful for the material from which the resonant chamber 20 and 40 is constructed to minimize the change in cell dimensions due to temperature. In the case where the CTE is not sufficiently small to make expansion negligible, the expansion effect could be calibrated out, although it may cause temporary measurement errors if the temperature changes more rapidly than the material expands or contracts. Resonant chamber 40 could be made from most any material having a very low CTE, such as polycarbonate, borosilicate glass tubing, carbon fiber/epoxy, aluminum 6061-T6, pine wood, ABS plastic and/or low carbon steel. This list given is not exhaustive and the inventors fully contemplate most any material with a low CTE could be used without departing from the spirit of the invention.

Other design considerations for a functional acoustic resonance chamber housing 50 are exchanging the gas in the resonant chamber 20 and 40 periodically or continuously to be representative of the gas being measured. However, directional movement of the gas inside the resonant chamber 20 and 40 can cause measurement errors because of the Doppler effect. This could be considered with whatever method is used to exchange the gas. For example, the gas flow rate can be kept low, or the gas may be transferred in batches with some time allowed for turbulence to subside or other means employed to cancel out the Doppler effect.

Figure 7:
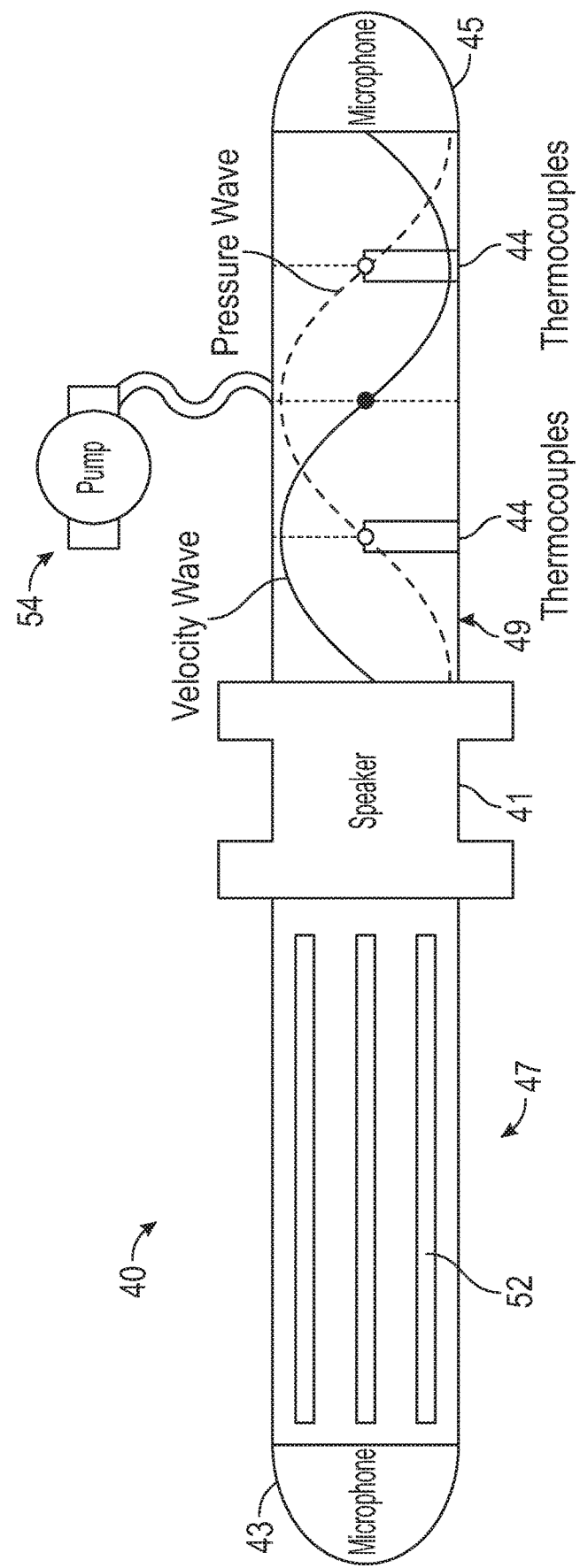
FIG. 7 is a pictorial representation of an acoustic resonance chamber in accordance with embodiments of the present invention.

Pump 54 can pressurize the k/M resonant chamber 40, either directly into air path 49, or into a larger pressure vessel (not shown) which contains k/M resonant chamber 40, so convection will occur at a reasonable rate. Shown in FIG. 7 is thermocouple(s) 44 which is positioned to measure the temperature of the air in k/M resonant chamber 40. However, in Tresonant chamber 20, pump 54 will input gas into air path 49 without changing the temperature, e.g., by compressing it or by friction loss in pipes. The design could either move the gas slowly enough the Doppler effect does not cause significant errors, or the gas could be moved in and out of the air path 49 in discrete batches to minimize motion inside the chamber during measurements. For example, air can be injected into the locations where the standing acoustic resonance has nodes and exhausted at other node locations, and the motion of the air in both directions will tend to minimize the Doppler effect. While T resonant chamber 20 is shown with a pump 54, it is possible pump 54 would not be needed to exchange the gas in the T cell. It may be possible for normal air movement to keep the Tresonant chamber 20 at the local ambient temperature.

Pump 54 can utilize a centrifugal fan as opposed to a diaphragm pump. The centrifugal fan provides for minimal vibrations, does not require heating or gas regulation and can provide lower pressures. Diaphragm pumps create large vibrations, the diaphragm and reed valves could be heated and can create pressure waves and higher pressures. These are all undesired effects.

With reference to FIG. 7 a pictorial representation of an acoustic resonance chamber in accordance with embodiments of the present invention is shown. Embodiments of the present invention show a resonant chamber 40 having a thermocouple(s) 44 to determine the composition of the lift gas (e.g., ratio of helium to air). The optimal location(s) for placing the thermocouple(s) will depend on the type of device(s) used. The thermocouple(s) 44 can measure the temperature of the air in the air path 49. The acoustic resonance chamber circuit 30 will measure the frequency and thus provide the speed of the sound created by speaker 41. The ratio of the adiabatic constant to the molecular weight can then be calculated once all the variables are known as discussed in detail above. Resonant chamber 20 is similar except it does not require thermocouples.

For temperature to be measured accurately, accurate values for the gas characteristic k/M are needed, because the gas makeup can change over the duration of a balloon flight due to diffusion or slow gas leaks.

Embodiments of the present invention include an effective way to deal with changes in the lift gas characteristics, e.g., due to slow leaks. Since the acoustic resonance chamber circuit 30 accurately measures the speed of sound in a gas, this information can be used either to calculate temperature when gas characteristics are known, or to calculate the gas characteristics when the temperature is known. The implementation of the gas characteristics measurement is accomplished by compressing a sample of the lift gas; using pump 54, along air path 49 of resonant chamber 40 sufficiently, so its temperature can be accurately measured with more conventional means, e.g., a thermocouple 44 or a laser pyrometer. When the speed of sound is measured by the acoustic resonance chamber circuit 30, the gas properties can be computed by processor 32, making them available for use with a companion device to measure the temperature of the undisturbed gas. The rising temperature of the gas due to compression is not a concern as the temperature can be accurately measured. A known temperature and the speed of sound in the gas are enough to compute the gas properties k/M with high accuracy.

Figure 8:
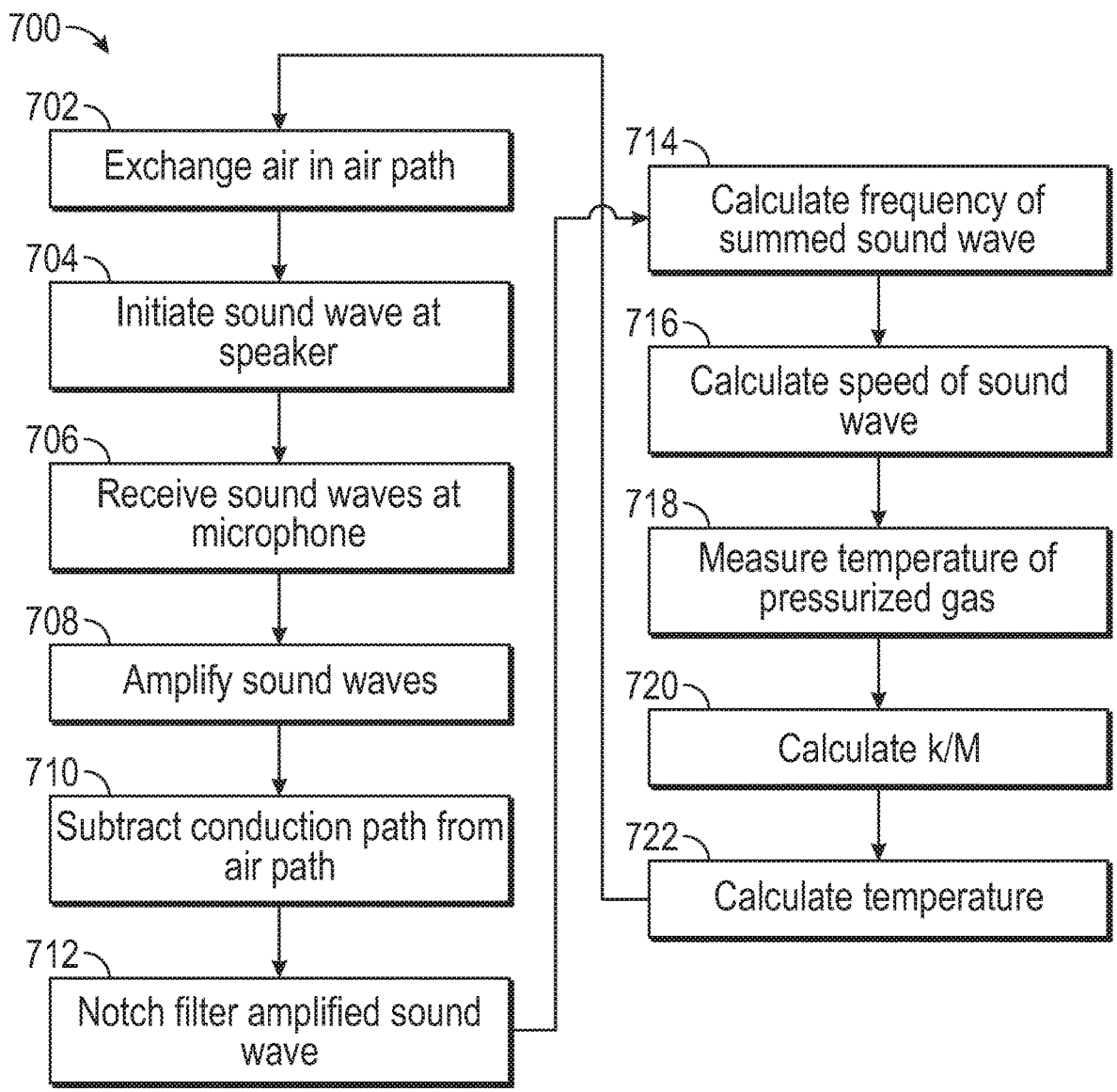
FIG. 8 is a flowchart diagram representation of a gas-characteristic program in accordance with an embodiment of the present invention.
Figure 9:
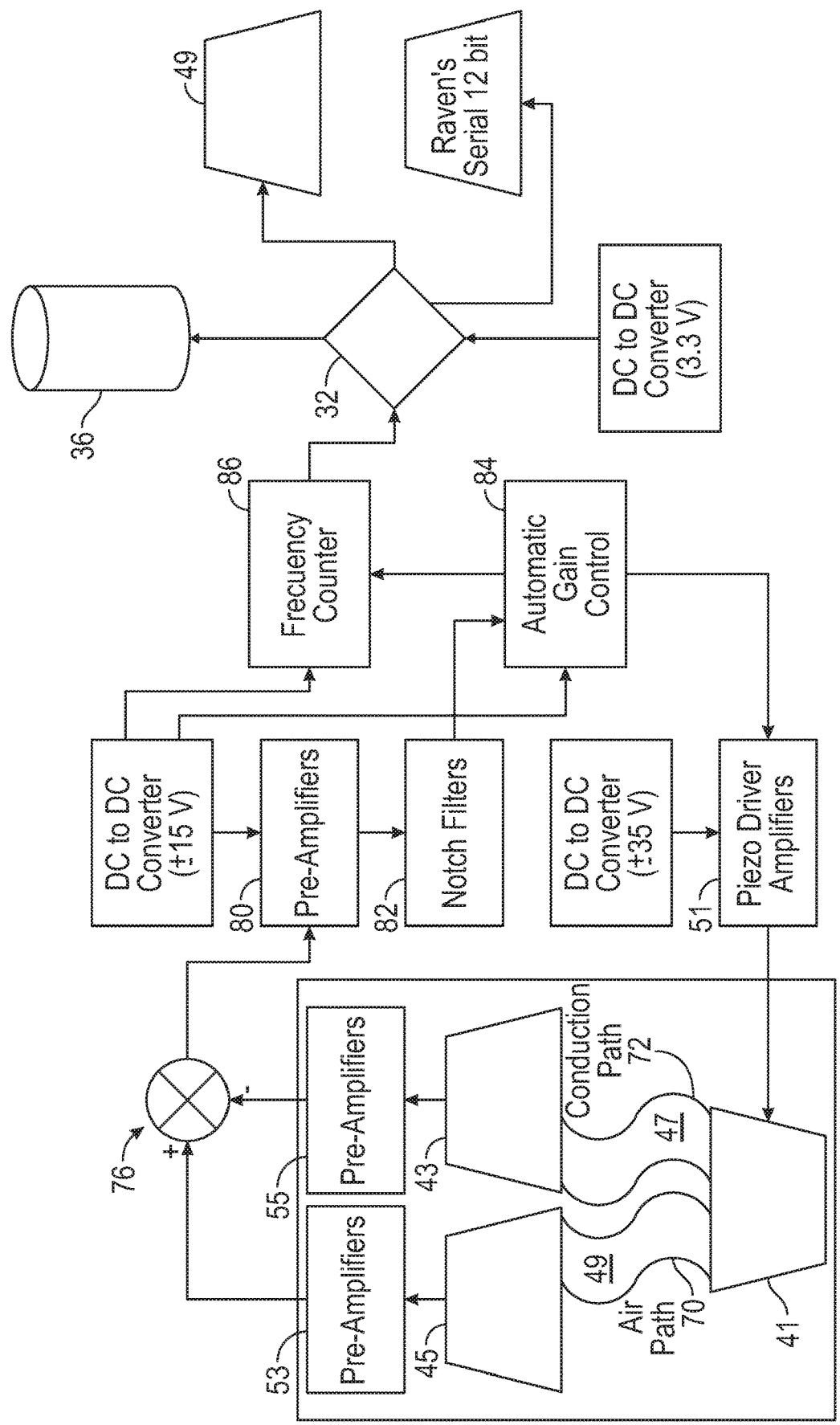
FIG. 9 is block pictorial representation of an acoustic resonance chamber circuit in accordance with embodiments of the present invention.

With reference to FIGS. 8 & 9, operation of a gas-characteristic program in accordance with an embodiment of the present invention is shown. Gas-characteristic program 700 measures the temperature and/or molecular weight of a gas by utilizing the speed of sound in the gas.

At state 702, gas-characteristic program 700 instructs pump 54 to exchange the gas in air path 49 for T resonant chamber 20 or to compress the gas in k/M resonant chamber 40. At state 704, processor 32 instructs piezo-driver amplifier 51 to initiate a sound wave at speaker 41. At state 706, sound waves 70 and 72 travel down air path 49 and conduction path 47 respectively and are received by microphones 45 and 43 respectively. At state 708, pre-amplifiers 53 and 55 amplify sound waves 70 and 72 respectively. At state 710, sound wave 72 is subtracted from sound wave 70 at summer 76. Thus, the sound wave 72 from the conduction path 47 is electronically subtracted from the sound wave 70, effectively cancelling the conducted acoustic errors in the sound wave 70. The summed frequency signal is then sent to another pre-amplifier 80, which amplifies the signal and sends it to a notch filter 82 for eliminating the frequencies above and below 2.2 kHz and 8.9 kHz at state 712. While a notch filter 82 is discussed for the purposes of the present embodiment, the inventors fully contemplate most any type of filter or wave shaping apparatus could be used to utilize the desired frequencies and eliminate noise. The summed frequency signal is sent to automatic gain control 84 to provide a controlled signal amplitude for frequency counter 86. At state 714 frequency counter 86 measures the frequency of the summed frequency signal and sends the frequency over to processor 32.

Because the speed of sound in a gas is dependent on the temperature of the gas, the temperature can be calculated from a measured frequency and wavelength. If the wavelength is known and the frequency can be measured, then the speed of the sound wave can be found from the equation: v=l*f where v is the speed of the sound wave, l is the wavelength of the sound wave and f is the frequency of the sound wave. Thus, processor 32 calculates the speed of the wave at state 716.

The implementation of the gas characteristics measurement is accomplished by compressing a sample of the lift gas in air path 49 sufficiently, so its temperature can be accurately measured with thermocouple(s) 44 at state 718. When the speed of sound is calculated at state 716, the gas properties can be computed. The rising temperature of the gas due to compression is not a concern as the temperature can be accurately measured. A known temperature and the speed of sound in the gas are enough for processor 32 to compute the gas properties k/M with high accuracy at state 720.

Combining equation, $$v = l*f \text{ with } v = \sqrt{\frac{kRT}{M}}$$

and solving for temperature gives the following equation:

$$T = \frac{(lf)^2 M}{kR}.$$

Therefore, once the ratio of the adiabatic constant to molecular weight is found, the rest of the variables are known or are measured, and the true temperature of the gas can be found at state 722. Gas-characteristic program 700 then returns to state 702 to begin the process over.

Figure 10:
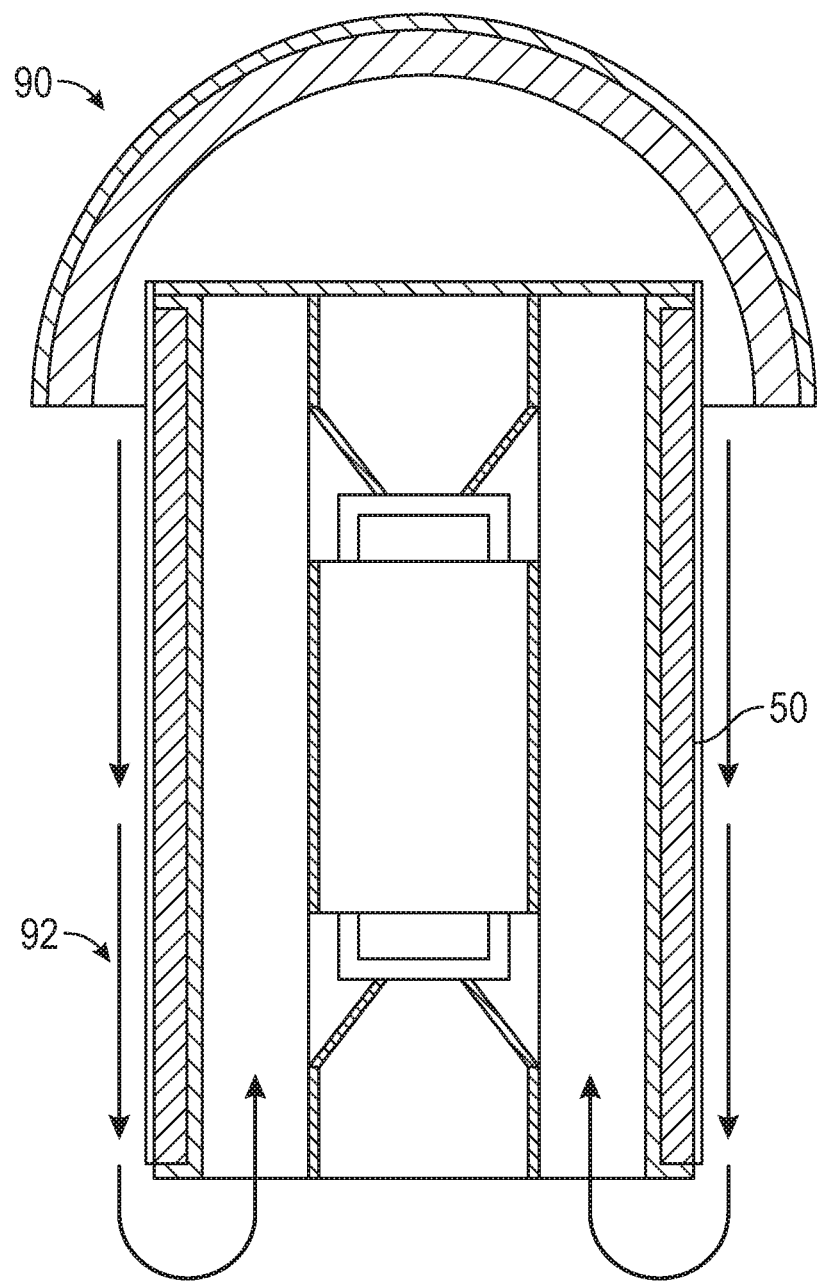
FIG. 10 is a pictorial representation of a radiation shield in accordance with the present invention.

With reference to FIG. 10 a pictorial representation of a radiation shield in accordance with the present invention is shown. Radiation shield 90 may be needed to provide adequate shielding from both the Sun and Earth. Radiant heating of the T resonant chamber 20 from solar radiation could cause errors if the tube is heated enough to transfer heat to the air being measured. Shield 90 can be designed to shield the resonant chamber 20 from the sun, but also provides enough gas flow inside the resonant chamber 20 to prevent re-radiation and convection from causing excess measurement errors. Radiation shield 90 also provides a structure for pump 54 to be fixed to resonant chamber housing 50. Radiation shield 90 further minimizes radiation between acoustic resonance chamber circuit 30 and the shield 90. As shown, radiation shield 90 allows for new air 92 to enter housing 50. Finally, acoustic resonance chamber circuit 30 is housed within housing 50 so vibrations and movement do not affect measurements. No radiation shield is required for k/M resonant chamber 40 because its temperature is accurately monitored by thermocouple 44.

Figure 11:
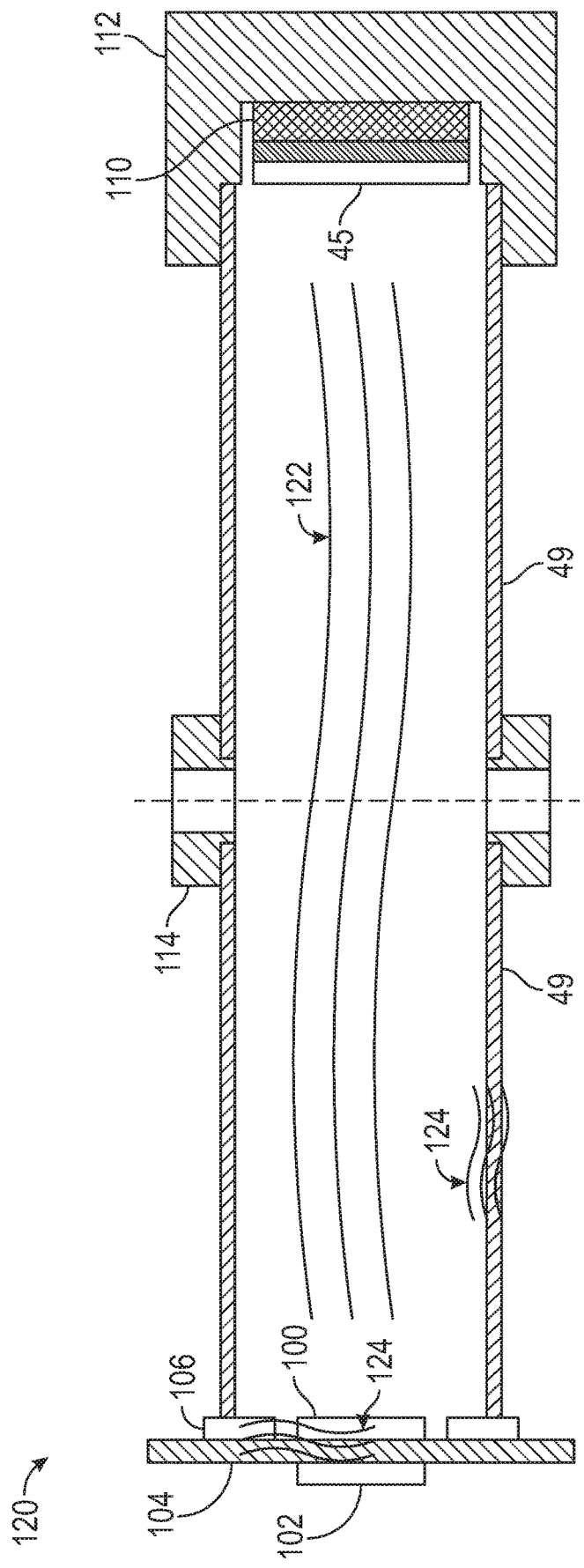
FIG. 11 is a pictorial representation of an acoustic resonance chamber in accordance with an embodiment of the present invention.

With reference to FIG. 11 a resonant chamber including source noise suppression in accordance with an embodiment of the present invention is shown. In addition to the embodiments disclosed above, another resonant chamber 120 and technique for suppression of conducted acoustic vibrations 124 between speaker 100 and microphone 45 described as "source suppression" is disclosed.

The error reduction technique, discussed in detail above, involved a second conducted path 47 and microphone 43 to mitigate errors caused by the conducted acoustic signal 124 present at the microphone 45 used to detect acoustic signals in the air path 49. While the two-tube embodiments above attempt to cancel the unwanted conducted vibrations 124 at the microphone 45, or "destination" end, "source suppression" is designed to minimize the conducted acoustic vibrations at the location where the acoustic signal in air is generated, at the speaker 100.

Figure 12:
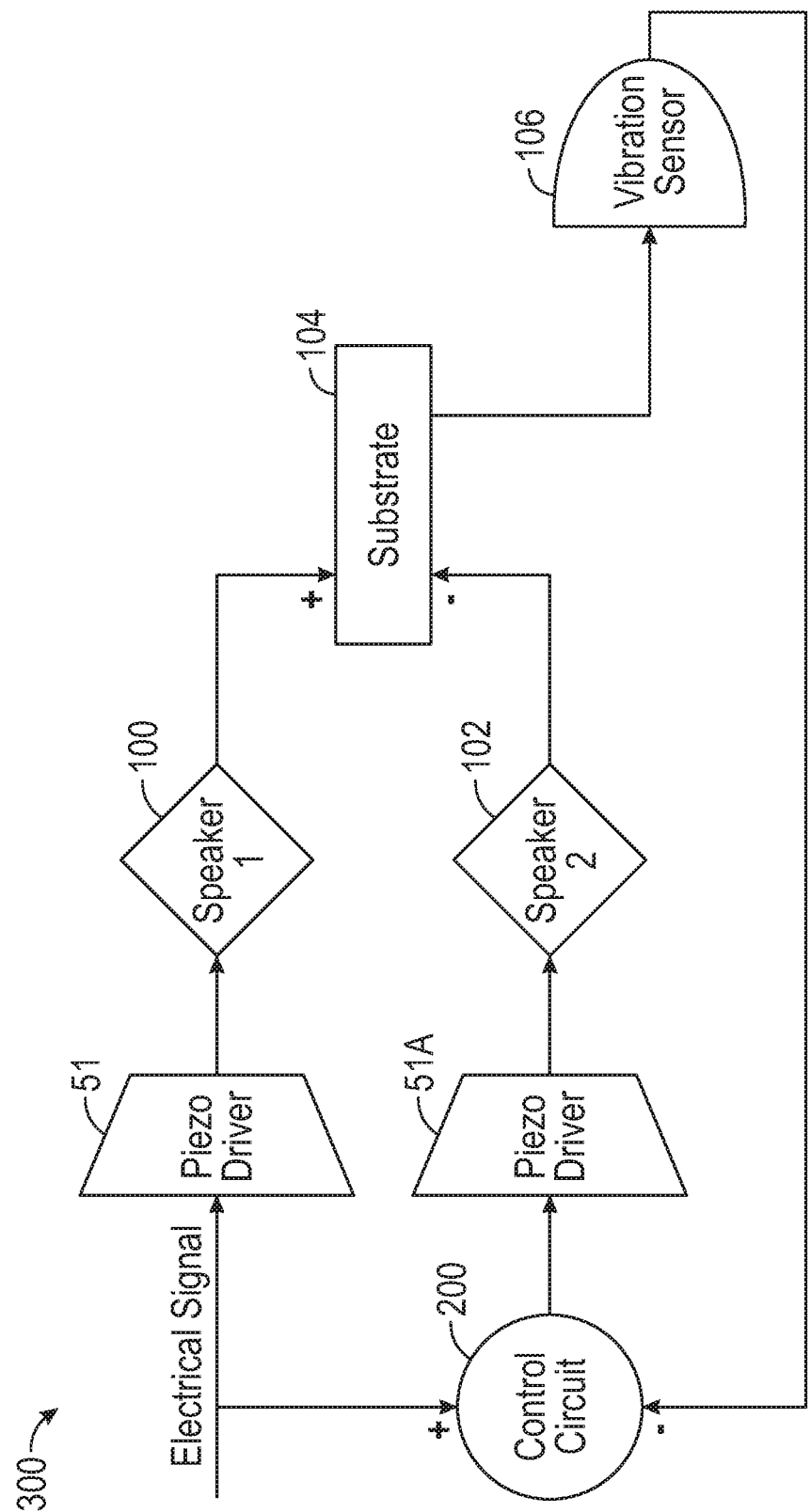
FIG. 12 is a circuit diagram for a noise cancellation circuit in accordance with an embodiment of the present invention.

The technique involves mounting similar piezoceramic speakers 100, 102 on opposite sides of a substrate 104, (e.g., printed wiring board) and driving both speakers 100, 102 simultaneously but with opposite directional polarization so the vibrations 124 in the substrate 104 are cancelled. Because of the difficulty in ensuring the two speakers 100, 102 have the same amplitude and phase in order to optimize the vibration cancellation, an embodiment might also include a vibration sensor 106, (e.g., a piezoceramic vibration sensor 106, attached to the substrate 104 at a point where it could detect, and measure vibrations 124 being conducted into the resonant chamber tube 120). A feedback control system 300 (shown in FIG. 12) would then be employed to drive the second speaker 102 in such a way as to minimize (cancel) the vibrations 124 being conducted into the resonant chamber tube 120.

FIG. 11 depicts one embodiment of the source suppression technique. For the sake of demonstration, it is stated the vibration cancellation in this embodiment is enough and further cancellation using a second, conducted path 47 is not needed. Speaker 100 performs a similar function as speaker 41 in previous figures. Speaker 102 is an additional speaker 102 mounted physically opposite speaker 100 on the substrate 104 to maximize the cancellation effect. Vibration sensor 106 is physically inserted in the path between the substrate 104 and the air path tube 49 so any vibrations conducted between the substrate 104 and the tube 49 will be detected as an electrical signal. An electrical detection and control circuit 200 (FIG. 12) drives speaker 102 in such a way the electrical signal coming from sensor 106 is driven arbitrarily close to zero, effectively cancelling the conducted vibrations 124 into tube 49.

With conducted vibrations 124 cancelled before they can enter the tube 49, this means microphone 45 will only receive an audio signal 122 in air, and the resonant vibrations thus detected will be free of the phase error and resonant frequency shift noted above.

FIG. 11 also includes instances of conducted noise cancellation features which are included to reduce the conducted vibrations 124 in the tube 49 resulting from the acoustic signal 122 in air being converted to a conducted vibration at the microphone 45. These conducted vibrations 124 originating at the microphone 45 are dampened by the silicone foam block 110 and silicone end cap 112 and are further decoupled from the path back to the vibration sensor 106 by the silicone coupler 114 midway between the two sections of glass in tube 49. If such secondary conducted vibrations were coupled into vibration sensor 106, they could disrupt the source vibration cancellation and reduce the accuracy of the resonant frequency detection. Silicone and silicone foam used in foam block 110, end cap 112 and coupler 114 can be utilized because they remain "squishy" or pliable at −80° C. It is possible there are other sound dampening materials just as effective without departing from the spirit of the invention.

The invention is not to be limited to the embodiments described herein. The foregoing description has been presented for purposes of illustration and description. It is not intended to be an exhaustive list or limit any of the invention to the precise forms disclosed. It is contemplated other alternatives or exemplary aspects are considered included in the invention. The description is merely examples of embodiments, processes or methods of the invention. It is understood any other modifications, substitutions, and/or additions can be made, which are within the intended spirit and scope of the invention.

What is claimed is:

1. A system for determining gas characteristics at high altitudes, comprising:
    a high-altitude balloon; comprising:
        a balloon;
        a balloonsat operably coupled to the balloon;
        an air path chamber wherein gas at a high altitude can occupy the air path chamber;
        a first speaker located on a substrate within the air path chamber, wherein the first speaker takes an electrical signal input and creates a first sound wave;
        a second speaker located on the substrate facing opposite of the first speaker located outside of the air path chamber, wherein the second speaker takes the electrical signal input and creates a second sound wave;
        a vibration sensor coupled to the substrate capable of measuring vibrations conducted by the substrate, wherein the vibration is the difference between the first and the second sound wave;
        a feedback control system electrically coupled to the air path chamber, wherein the feedback control system sends an output of the vibration sensor to an electrical detection and control circuit which subtracts the output of the vibration sensor from the electrical signal input originally driving the first and the second speakers, wherein the difference between the electrical signal input and the vibration sensor is sent to the second speaker to create a third sound wave, the vibration sensor then detects a difference between the first sound wave and the third sound wave to minimize vibrations being conducted into the air path chamber; and
        a microphone located within the air path chamber opposite the first speaker.

2. The system of claim 1, further comprising:
    a silicone foam block and end cap coupled to the microphone to prevent conducted vibrations traveling through the substrate from reaching the microphone.

3. The system of claim 1, further comprising:
    a silicone coupler located midway between the first speaker and the microphone to isolate the microphone from vibrations traveling through the substrate.

4. The system of claim 3, wherein a vibration cancelation iterative process is repeated where the vibration sensor continually sends the output of the vibration sensor to the electrical detection and control circuit, which subtracts this signal from the electrical signal input, which then drives the second speaker, which creates a vibration sensed by the vibration sensor, which then sends the output of the vibration sensor detected back to the electrical detection and control circuit.

5. The system of claim 4, further comprising:
    a first piezo driver amplifying the electrical signal input to the first speaker and a second piezo driver amplifying the signal from the electrical detection and control circuit to the second speaker.

6. A system for determining gas characteristics at high altitudes, comprising:
- a balloon having a balloonsat and an air path chamber operably disposed on the balloon, wherein gas at a high altitude can occupy the air path chamber;
- a first speaker disposed within the air path chamber, wherein the first speaker receives an electrical signal input and creates a first sound wave;
- a second speaker disposed opposite the first speaker outside of the air path chamber, wherein the second speaker receives the electrical signal input and creates a second sound wave;
- a vibration sensor operably configured for measuring a vibration difference between the first and the second sound wave;
- an electrical detection and control circuit configured to compute a difference between the electrical signal input and an output of the vibration sensor;
- a third sound wave created by the second speaker using the difference between the electrical signal input and an output of the vibration sensor;
- a difference between the first sound wave and the third sound wave detected by the vibration sensor and configured to minimize vibrations being conducted into the air path chamber; and
- a microphone located within the air path chamber opposite the first speaker.

7. The system of claim 6, further comprising:
a substrate operably disposed for conducting vibrations.

8. The system of claim 6, further comprising:
a substrate with the first speaker operably disposed within the air chamber.

9. The system of claim 6, further comprising:
a substrate with the first speaker operably disposed within the air chamber and the second speaker operably disposed on the substrate facing opposite the first speaker.

10. The system of claim 6, further comprising:
a substrate with the vibration sensor operably coupled to measure the vibration conducted by the substrate.

11. The system of claim 6, further comprising:
a silicone foam block and end cap coupled to the microphone to prevent conducted vibrations traveling through a substrate from reaching the microphone.

12. The system of claim 6, further comprising:
a silicone coupler located midway between the first speaker and the microphone to isolate the microphone from vibrations traveling through a substrate.

13. The system of claim 6, further comprising:
a vibration cancelation iterative process made operable by the electrical detection and control circuit, wherein the vibration cancelation iterative process is repeated wherein the vibration sensor continually sends the output of the vibration sensor to the electrical detection and control circuit, which subtracts this signal from the electrical signal input, which then drives the second speaker, which creates a vibration sensed by the vibration sensor, which then sends the output of the vibration sensor detected back to the electrical detection and control circuit.

14. The system of claim 6, further comprising:
a first piezo driver amplifying the electrical signal to the first speaker and a second piezo driver amplifying the signal from the electrical detection and control circuit to the second speaker.

15. The system of claim 6, wherein high altitudes comprise altitudes at or above 70,000 feet.

16. A system for determining gas characteristics at high altitudes, comprising:
- a balloon having a balloonsat and an air path chamber operably disposed on the balloon, wherein gas at a high altitude can occupy the air path chamber;
- first and second speakers operably connected to receive an electrical signal input and create respective first and second sound waves;
- a vibration sensor operably configured for measuring a vibration difference between the first and second sound waves;
- an electrical detection and control circuit configured to compute a difference between the electrical signal input and an output of the vibration sensor;
- a third sound wave created by the second speaker using the difference between the electrical signal input and an output of the vibration sensor; and
- a difference between the first sound wave and the third sound wave detected by the vibration sensor and configured to minimize vibrations being conducted into the air path chamber.

17. The system of claim 16, further comprising:
a microphone operably disposed within the air path chamber opposite the first speaker.

18. The system of claim 16, further comprising: a substrate with the first speaker operably disposed within the air chamber for conducting vibrations.

19. The system of claim 16, further comprising: a substrate with the first speaker operably disposed within the air chamber and the second speaker operably disposed on the substrate facing opposite the first speaker.

20. The system of claim 16, further comprising: a substrate with the vibration sensor operably coupled to measure the vibration conducted by the substrate.

* * * * *